(12) United States Patent
Hu et al.

(10) Patent No.: US 10,505,719 B2
(45) Date of Patent: *Dec. 10, 2019

(54) METHOD AND SYSTEM FOR RATELESS AND POLLUTION-ATTACK-RESILIENT NETWORK CODING

(71) Applicant: International Business Machines Corporation, Armonk, NY (US)

(72) Inventors: Xin Hu, White Plains, NY (US);
Wentao Huang, Pasadena, CA (US);
Jiyong Jang, White Plains, NY (US);
Theodoros Salonidis, Boston, MA (US); Marc Ph Stoecklin, White Plains, NY (US); Ting Wang, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 285 days.

This patent is subject to a terminal disclaimer.

(21) Appl. No.: 15/141,049

(22) Filed: Apr. 28, 2016

(65) Prior Publication Data
US 2017/0317819 A1    Nov. 2, 2017

(51) Int. Cl.
| H04L 29/00 | (2006.01) |
| H04L 9/06 | (2006.01) |
| H04L 9/08 | (2006.01) |
| H04L 29/06 | (2006.01) |

(52) U.S. Cl.
CPC ........... *H04L 9/0643* (2013.01); *H04L 9/088* (2013.01); *H04L 63/0428* (2013.01); *H04L 63/123* (2013.01)

(58) Field of Classification Search
None
See application file for complete search history.

(56) References Cited

U.S. PATENT DOCUMENTS

| 7,924,761 B1 | 4/2011 | Stevens |
| 8,368,929 B2 * | 2/2013 | Watanabe ............... H04N 1/001 358/1.13 |

(Continued)

FOREIGN PATENT DOCUMENTS

| WO | WO 2015/036086 A1 | 3/2015 |
| WO | WO 2015/049042 A1 | 4/2015 |

OTHER PUBLICATIONS

"2014 XIV International Symposium on Problems of Redundancy in Information and Control Systems", preface and table of contents, AN-14869656; IEEE Conference; 2014.

(Continued)

*Primary Examiner* — Ghazal B Shehni
(74) *Attorney, Agent, or Firm* — Jeffrey S. LaBaw, Esq.; McGinn IP Law Group, PLLC

(57) ABSTRACT

An encoder including a computer readable storage medium storing program instructions, and a processor executing the program instructions, the processor configured to generating a message by aggregating a plurality of incoming packets, constructing an encoded message using the message and a random matrix, constructing of a hash using a shared secret, and transmitting the encoded message and the hash to a destination, through a network that performs network coding operations.

20 Claims, 9 Drawing Sheets

(56) References Cited

U.S. PATENT DOCUMENTS

2013/0308700 A1* 11/2013 Koike-Akino ...... H03M 13/373
375/240.07
2014/0149830 A1* 5/2014 Kim ..................... H04L 1/0047
714/776

OTHER PUBLICATIONS

Angelopoulos, G. et al., "Experimental Study of the Interplay of Channel and Network Coding in Low Power Sensor Applications", IEEE; 2013.
Internet Society RFCs et al., "Randomness Requirements for Security (RFC4086)", ip.com, Jun. 4, 2005.
IBM et al., "Random Access Memory Implementation of Interlaced Error Correction Codes", ip.com, Feb. 26, 2005.
Huang, Wentao, et al., "Rateless and Pollution-Attack-Resilient Network Coding", 2015 IEEE International Symposium on Information Theory (ISIT), Conference, Hong Kong, Jun. 14-19, 2015, pp. 2623-2627.

* cited by examiner

1200

METHOD AND SYSTEM FOR RATELESS AND POLLUTION-ATTACK-RESILIENT NETWORK CODING

CROSS REFERENCE TO RELATED APPLICATIONS

The present application is a related Application of co-pending U.S. patent application Ser. No. 15/141,082, of which is filed Apr. 28, 2016 the entire contents of which are incorporated herein by reference.

BACKGROUND OF THE INVENTION

Field of the Invention

The disclosed invention relates generally to a method and system for network coding, and more particularly, but not by way of limitation, relating to a system, apparatus, and method for rateless and pollution-attack-resilient network coding.

Description of the Related Art

A source wishes to multicast information to a set of terminals over a network. The technique of network coding, i.e., allowing routers to mix the information in packets before forwarding them, is able to maximize network throughput, improve robustness against packet losses, and can be efficiently implemented in a distributed manner. However, network coding is vulnerable to packet transmission errors caused by adversarial jamming, as one single corrupted packet may pollute many more others in the process of mixing.

The use of coding approach to correct adversarial errors for network coding systems has been introduced, and capacity achieving code constructions are studied for various adversary and network models. However, coding schemes usually need to assume a given capacity of the network and a number of links controlled by the adversary, for the purposes of code design, encoding and decoding.

This assumption may be overly restrictive in many practical settings. For example, estimating the network capacity may be costly; the capacity may change over time; and the number of links controlled by the adversary may not be available. To address this issue, rateless network error correction codes, i.e., coding schemes that do not require prior knowledge of the network and adversary parameters, are studied. However, designing low-complexity rateless coding schemes is still an open problem.

Therefore, there is need for providing a rateless network error correction codes that have low-complexity. There is also a need to have a reliable multicast over a network in the presence of adversarial errors.

SUMMARY OF INVENTION

In view of the foregoing and other problems, disadvantages, and drawbacks of the aforementioned background art, an exemplary aspect of the disclosed invention provides a system, apparatus, and method of providing for rateless and pollution-attack-resilient network coding.

One example aspect of the disclosed invention provides an encoder including a computer readable storage medium storing program instructions, and a processor executing the program instructions, the processor configured to generating a message by aggregating a plurality of incoming packets, constructing an encoded message using the message and a random matrix, constructing of a hash using a shared secret, and transmitting the encoded message and the hash to a destination, through a network that performs network coding operations.

The generating of the message is by aggregating a plurality of incoming packets of a plurality of bits each. The hash is transmitted alone or as a header of the encoded message. The hash is transmitted with a redundancy. The construction of an encoded message comprises $X_i = K_i M$ using a random matrix $K_i$ and received message M, where i is a positive integer. The construction of the hash comprises $\underline{X}i$ using shared secret between source and destination(s) in transmitting the encode message to the destination(s). The encoder transmits the hash $\underline{X}i$ to the destination(s) using a strong type redundancy. The constructing of the hash, transmitting of the encoded message, and transmitting of the hash are repeated N times, where N is a positive integer.

A system including the encoder can further include a decoder deployed in one or more terminals, the decoder including a second computer readable storage medium storing program instructions, and a second processor executing the program instructions, the second processor configured to receiving a noisy message and a noisy hash from the network, searching for a pair of matching candidates for the hash and message from the two row spaces of the noisy message vectors using the shared secret with the encoder, and outputting, by the decoder, a decoded message if the searching is successful.

If the decoder is not successful in the searching, then the receiving and the searching are repeated for the next message. The system can further include creating noisy message vectors from the noisy message and the noisy hash before the searching. The decoder receives the noisy message Yi for storage in the second memory, and the decoder uses a shared secret randomness to construct a matrix Pi in an equation that is checked for a unique solution.

The decoder creates noisy message vectors $Y^i = [Y1, \ldots, Yi]$ and noisy hash vectors $\underline{Y}^i = [\underline{Y}1, \ldots, \underline{Y}i]$ for the searching, where i is a positive integer. The decoder searches for the pair of matching candidates from the two row spaces of $Y^i$ and $\underline{Y}^i$ using the shared secret between source and destination(s).

Yet another example aspect of the disclosed invention includes a method, including generating a message by aggregating a plurality of incoming packets, constructing an encoded message using the message and a random matrix, constructing of a hash using a shared secret, and transmitting the encoded message and the hash to a destination, through a network that performs network coding operations.

The hash is transmitted alone or as a header of the encoded message. The hash can be transmitted with a redundancy. The construction of an encoded message comprises $X_i = K_i M$ using a random matrix $K_i$ and received message M, where i is a positive integer, and the construction of the hash includes $\underline{X}i$ using shared secret between source and destination(s) in transmitting the encode message to the destination(s).

The method further includes, from at least one node, receiving a noisy message and a noisy hash from the network, searching for a pair of matching candidates for the hash and message from the two row spaces of the noisy message vectors using the shared secret, and outputting a decoded message if the searching is successful.

In another example aspect of disclosed invention, a computer program product for encoding, the computer program product comprising a computer readable storage medium having program instructions embodied therewith, the program instructions readable and executable by a computer to cause the computer to generate a message by aggregating a plurality of incoming packets, construct an encoded message using the message and a random matrix, construct a hash using a shared secret, and transmit the encoded message and the hash to destination(s), through a network that performs network coding operations.

The hash can be transmitted alone or as a header of the encoded message. The hash can be transmitted with a redundancy, wherein the construction of an encoded message comprises $X_i=K_iM$ using a random matrix $K_i$ and received message M, where i is a positive integer, and wherein the construction of the hash comprises $\underline{X}i$ using shared secret between source and destination(s) in transmitting the encode message to the destination(s).

From at least one node, the computer product further includes receiving a noisy message and a noisy hash from the network, searching for a pair of matching candidates for the hash and message from the two row spaces of the noisy message vectors using the shared secret, and outputting a decoded message if the searching is successful.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF DRAWINGS

The exemplary aspects of the invention will be better understood from the following detailed description of the exemplary embodiments of the invention with reference to the drawings.

DETAILED DESCRIPTION OF A PREFERRED EMBODIMENTS

Figure 1:
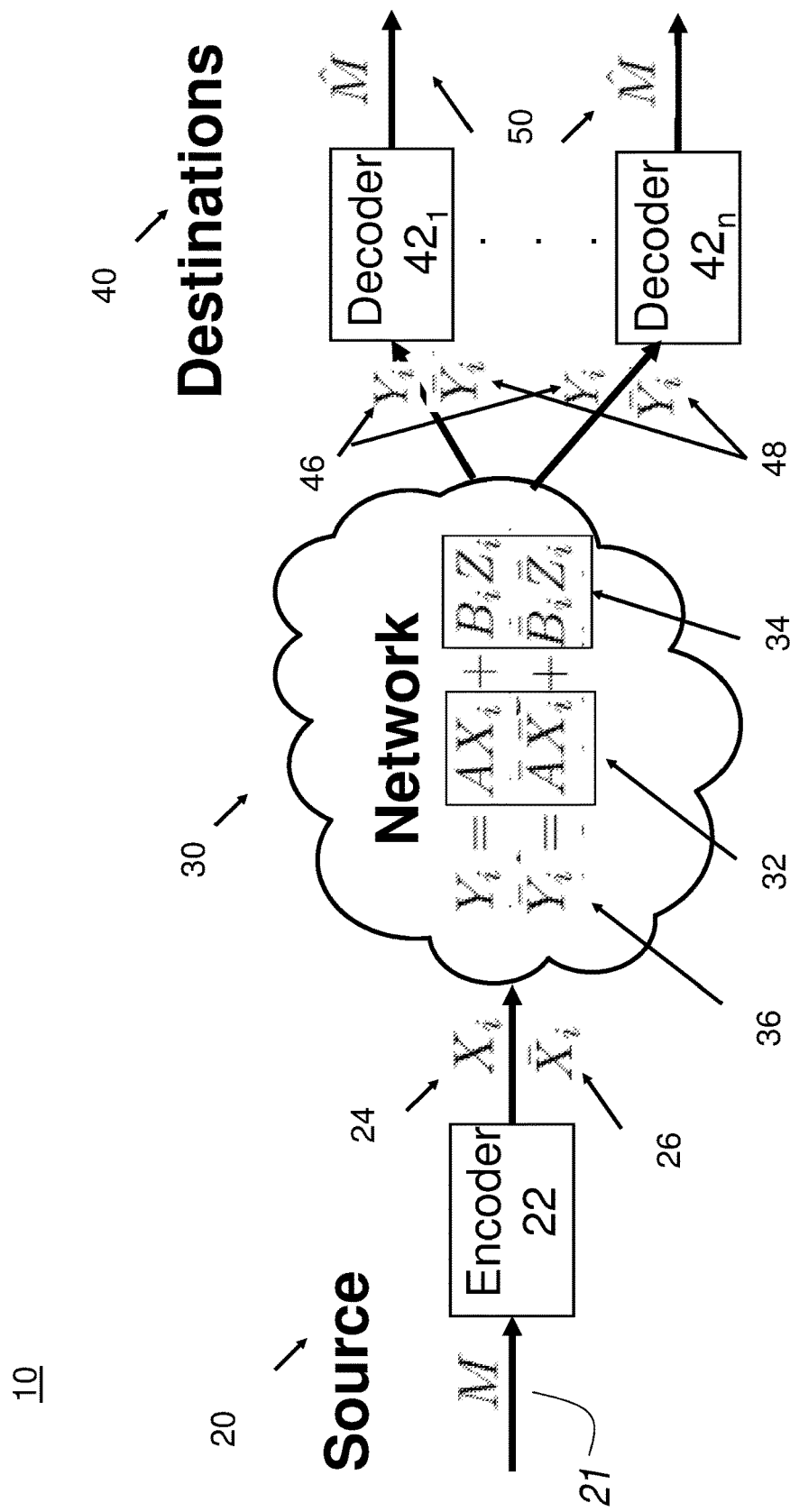
FIG. 1 illustrates a system in an example embodiment.

The invention will now be described with reference to the drawing figures, in which like reference numerals refer to like parts throughout. It is emphasized that, according to common practice, the various features of the drawing are not necessary to scale. On the contrary, the dimensions of the various features can be arbitrarily expanded or reduced for clarity. Exemplary embodiments are provided below for illustration purposes and do not limit the claims. One of the problems with all existing codes is that they require the knowledge of the min-cut (minimum cut value) of the network, and the number of errors in advance, for the purpose of code construction, encoding and decoding. This information is needed because one needs to know these values in order to decide how much redundancy to build into the codes.

However, estimating the min-cut (max-flow min-cut theorem, where the minimum cut value in a network can be the same as the maximum flow value.) and z (error packets) is usually not easy. For example, there can be large networks, changes, and hidden portions of the network. But then if one cannot estimate precisely, then this will cause problems because then one underestimates the strength of the adversary then. On the other hand, if one overestimates, there is too much redundancy.

It is proposed to provide a simple, efficient and rateless error correction schemes for network coding systems. The schemes are based on rateless network error correction codes, and do not require a priori estimates of the network capacity and the number of errors. The codes can be efficiently encoded and decoded, and are end-to-end in the sense that only the source and the terminals need to participate in error correction. The codes are asymptotically throughput-optimal and are universal in the sense that they are oblivious to the underlying network topology and to the particular linear network coding operations performed at intermediate network nodes. Rateless error correction is more than just erasures, but includes packets polluted by errors. The decoder has to find out how much "clean information" without pollution by errors is received, and distill the clean information.

A design of the rateless network error correction code is first under the assumption that the source and terminals share random bits which are secret from the adversary. The encoder uses the random bits to hash the message and helps the decoders eliminate injected errors. Over time, the source incrementally sends more linearly dependent redundancy of the message M (as message $Xi=KiM$) as well as a sequence of short hashes through the network. The terminal amasses both the redundancy and the hashes until it decodes successfully, which happens with high probability once the amount of redundancy received meets the cut-set bound. Then it is noted that the secret random bits can be efficiently generated by a cryptographic pseudorandom generator, provided that the adversary is computationally bounded, and that the source and terminals share a short key. Moreover, the communication overhead (amount of hash transmitted)

of the present scheme is significantly lower. Finally, a way to substantially reduce the field size by using universal hashing is introduced.

Cryptographic schemes also operate in a rateless manner independently from the network and adversary parameters. However, in order to remove error packets promptly before they contaminate others, frequent cryptographic verification of packets is necessary at intermediate network nodes for these schemes. By contrast, the present schemes are end-to-end and do not require any collaboration from intermediate network nodes.

Therefore, the disclosed system can be designed for error correcting codes for a "black box" network, where the network is viewed in terms of input and output or transfer characteristics without knowing the internal components. The known information can be linearity over a field of size "q", and the unknowns can be the Min-cut (minimum cut value in a network or maximum flow), "$z$" (error packets), topology, and specific network codes. The disclosed technique asymptotically achieves optimal throughput (MinCut−$z$), while being low complexity end-to-end, and based on (negligible amount of) private shared randomness.

Referring to FIG. 1, a system 10 is shown including a source 20, network 30 and destinations (terminals) 40. A network can be modeled as a directed graph, where the set of vertices represents network nodes and the set of edges represents noiseless network links. The network operates in a synchronized manner and each link can send a symbol from a finite field per transmission. A source 20 wishes to communicate reliably to a terminal. The linear network code C is a set of encoding functions defined over each edge. Each function takes as input the signals received from all incoming edges at one end, and evaluates to the signal transmitted over the edge.

To transmit information over the network 30, the source 20 generates a batch of encoded packets as input to the network 30, represented by a matrix X, where packets are rows. As the packets travel through the network, they undergo linear transforms defined by the network code C. Without loss of generality, it is assumed C is capacity-achieving, i.e., in the absence of adversarial errors 34, the terminal will observe a matrix AX 32 (network coding operations), where A is the network transform matrix.

The adversary controls a subset of edges in the network 30, modeled in the following way. For each compromised edge, the adversary injects an error packet so that the packet received from this edge is the addition of the error packet and the packet originally transmitted on the edge. As the injected error packets travel through the network 30, they undergo linear transforms defined by the network code C. The terminal receives the sum of the linearly transformed error packets and the linearly transformed X. More precisely, the terminal observes a matrix Y=AX+BZ (36), where B is the network transforming matrix (determined by the network code) from the compromised edges to terminal, and Z are the injected error packets.

Therefore, a message M is received by the encoder 22, which then generates transmit Tx message of period i 24 (i.e., Xi) and transmit Tx Hash of period i 26 (i.e., $\overline{X}_i$), which are sent to the network 30. From the network 30, a receive Rx Message of period i 46 (i.e., $Y_i$) is sent to decoder $42_1$ and receive Rx Hash of period i 48 (i.e., $\overline{Y}_i$) is received by decoder $42_n$. The decoders (decoders $42_1$ to $42_n$, where n is a positive integer) then output decoded message 50.

The network 30 can be represented as a directed graph $\mathcal{G} = (\mathcal{V}, \mathcal{E}$, where the set of vertices $\mathcal{V}$ represents network nodes and the set of edges $\mathcal{E}$ represents noiseless network links. Denote by C the min-cut (or max-flow) of the network with respect to s and t. The linear network code $\mathcal{C}$ implemented in $\mathcal{G}$ is represented by a set of encoding functions $\mathcal{C}$. For each compromised edge (u; v), the adversary injects an error packet so that the packet received by v from this edge is the addition of the error packet and the packet originally transmitted on the edge. The terminal 40 observes a matrix Y=AX+BZ, where B is the network transform matrix (determined by the network code) from the compromised edges to t, and Z are the $z_e$ injected error packets. The adversary may choose Z carefully in order to corrupt the communication between s and t. Note that $z_e$, Z and B are not known to the source 20 and the terminal 40. The network 30 shows the matrix Y=AX+BZ with the network coding operations 32 (AX) and the adversarial error 34 (BZ).

It is assumed that the source 20 and terminal destinations 40 share secret randomness. The shared secret randomness is helpful for increasing the capacity of the network and the shared secret randomness facilitates hashing and verification of the packets independently of $z_e$, the number of injected error packets. Formally, secret randomness is defined as a sequence of symbols i.i.d. uniformly drawn from $\mathbb{F}_q$ (the finite field of symbols transmitted as data over the network). The sequence of symbols are drawn secretly from the adversary and are independent from the source message M. It is noted that the secret random bits of the shared secret randomness can be efficiently generated by a cryptographic pseudorandom generator.

At a high level, in the present scheme the encoder 22 incrementally sends more linearly dependent redundancy $X_i$ of the message M through multiple stages. The message will be contained in the row space of the received matrices of packets after a number of stages. Additionally, the source 20 sends a sequence of short hashes to facilitate the decoder 42 to pinpoint the message from the row space. Hash transmissions are protected by strong redundancy. Since the hashes are short, the induced overhead is small and is negligible in the packet length.

The system 10 can communicate over multiple time periods, where for example, decoders $42_1$ to $42_n$ are used for multiple time periods n (where n is an integer). In the following, the encoder 22 for the source 20 and the decoder 42 for the terminal (or destination) 40 is described in more detail.

Figure 2:
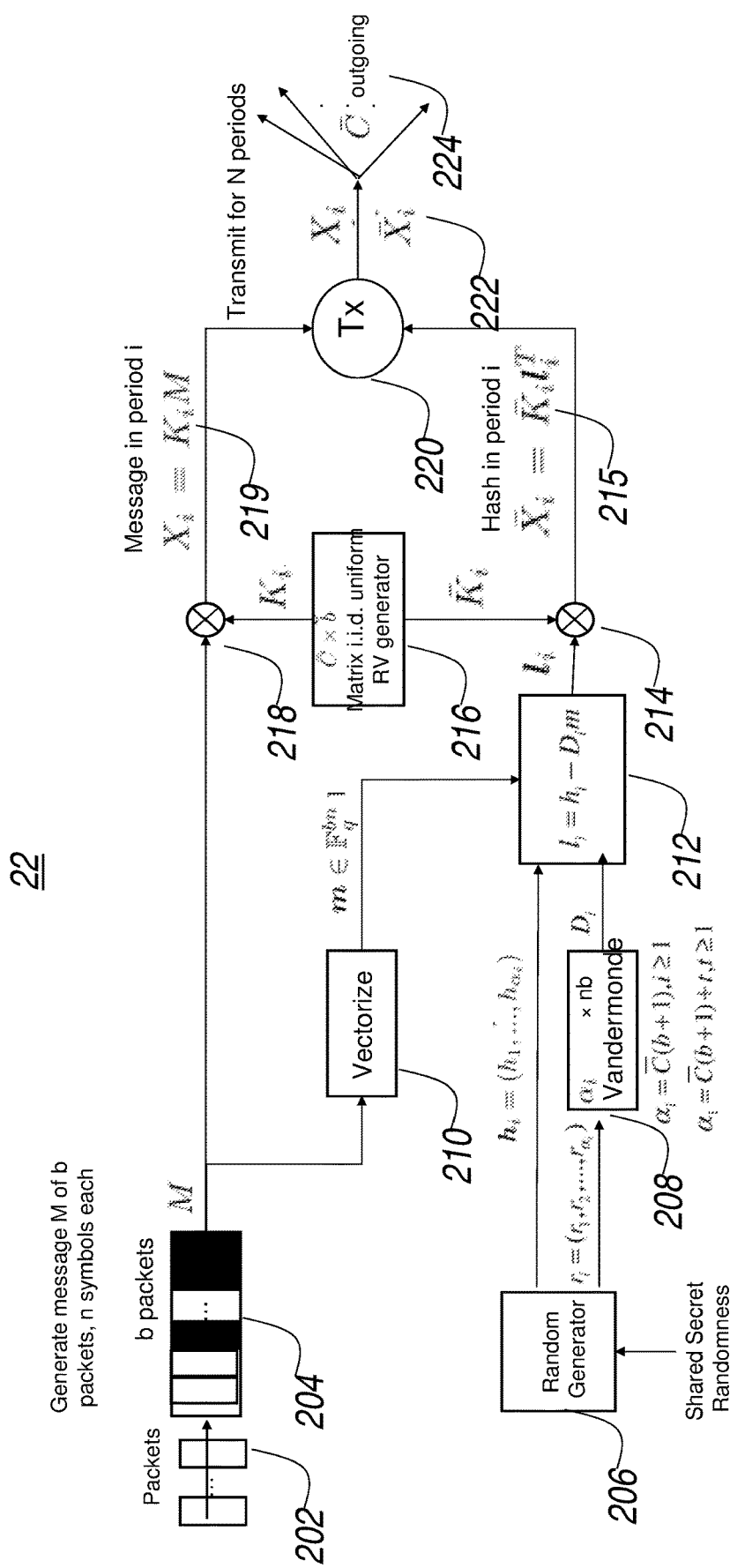
FIG. 2 illustrates further detail of an encoder in an example embodiment.

Referring to FIG. 2, the encoding 22 is further detailed. The encoder 22 produces streams of encoded packets using random linear codes. The encoder 22 also provides a hash of the encoded packets (using shared randomness) and transmits as packet header.

Suppose the source wishes to transmit a message of b packets 204, each consisted of n symbols, represented by a b×n matrix M. Therefore, the packets 202 are aggregated into b incoming packets 204 to generated message M.

The communication of message M may last for several stages and during stage i, the source draws a random matrix $K_i$ with entries i.i.d. 216 uniformly distributed. The source encodes $X_i = K_i M$, and inputs $X_i$ to the network 30. The transmit Tx 220 is for N periods (where N is a positive integer). Thereafter Xi undergoes the network transform as it travels through the network 30.

To construct the hashes, the vectorization 210 of a matrix is a linear transformation, which converts the matrix into a column vector by stacking the columns of the matrix on top of another. Let the column vector m be the vectored M. Denote by $\overline{C}$ the number of out-going edges of the source 20, so $\overline{C} \geq C$.

To transmit information over the network 30, the source 20 generates a batch of $\overline{C}$ encoded packets of length n as input to the network 30, represented by a matrix $$X \in \mathbb{F}_q^{c \times \overline{C}},$$

where packets are rows. As the packets travel through the network 30, they undergo linear transforms defined by the network code $\mathcal{C}$. Without loss of generality it is assumed $\mathcal{C}$ is capacity-achieving, i.e., in the absence of adversarial errors, the terminal t will observe a matrix AX, where $$A \in \mathbb{F}_q^{c \times \overline{C}}$$

is the network transform matrix of rank C. Note that A is not known to the source 20 and the destination terminal 40.

Referring back to FIG. 1, the adversary controls $z_e < C$ edges in the network 30, modeled in the following way. For each compromised edge (u, v), the adversary injects an error packet so that the packet received by v from this edge is the addition (over $\mathbb{F}_q$, (finite field)) of the error packet and the packet originally transmitted on the edge. As the injected error packets travel through the network 30, they undergo linear transforms defined by the network code $\mathcal{C}$. The terminal 40 receives the sum of the linearly transformed error packets and the linearly transformed X. More precisely, the terminal 40 observes a matrix Y=AX+BZ, where $B \in \mathbb{F}_q^{C \times zq}$ is the network transform matrix (determined by the network code) from the compromised edges to t, and $Z \in \mathbb{F}_q^{ze \times n}$ are the $z_e$ injected error packets. The adversary may choose Z carefully in order to corrupt the communication between s (source 20) and t (terminal 40). Note that $z_e$, Z and B are not known to the source 20 and the terminal 40.

One can call one stage as the transmission of one batch of encoded packets, i.e., a matrix X. For a scheme involving N stages, denote by $X^N$ and $Y^N$ the sequences of matrices transmitted by s (source 20) and received by t (terminal 40). Let M be a source message chosen from an alphabet $\mathcal{M}$. If there exists a scheme that maps M to $X^N$, and maps $Y^N$ to $\hat{M}$, such that for all $M \in \mathcal{M}$, regardless of the errors injected by the adversary (e.g., jammer), $\Pr\{M \neq \hat{M}\} \to \overline{0 \text{ as}}$ q→∞, then one can say a throughput of $$\frac{\log_q |M|}{Nn}$$

is feasible and is achieved by the corresponding scheme. The capacity of the network is the supremum over all feasible throughputs.

The rateless network error correction code is clarified further in the following. One can assume that the source 20 and the terminal 40 share secret randomness. Formally, the source 20 and the terminal 40 agree on a sequence of symbols i.i.d. uniformly drawn from $\mathbb{F}_q$. The sequence of symbols are drawn secretly from the adversary, and are independent from the source message M. The shared secret randomness are helpful for two reasons. Firstly, it increases the capacity of the network. More precisely, the network capacity is $C - 2z_e$ if the adversary is all-knowing; and it increases to $C - z_e$ if there is a secret that the adversary does not know. Secondly, the shared secret randomness facilitates hashing and verification of the packets, independently from the value of $z_e$. Particularly, the scheme described in this section needs only a very small amount of secret randomness.

Therefore, in the present scheme the encoder 22 incrementally sends more linearly dependent redundancy of the message through multiple stages. The message will be contained in the row space of the received matrices of packets after a number of stages.

Referring back to FIG. 2, lett $_{\alpha 1} = \overline{C}(b+1)+t, t \geq 1$ and $_{\alpha i} = \overline{C}(b+1), i \geq 1$ be the length of the hash constructed at the i-th stage 208 to generate a parity check matrix $_{Di}$ (Vandermonde type matrix). A Vandermonde matrix includes terms of a geometric progression in each row or each column with the first element being 1. The source 20 draws $_{\alpha i}$ symbols $_{ri} = (_{r1}, _{r2}, \ldots, _{r\alpha i})$, and another $_{\alpha i}$ symbols $_{hi} = (h1, h2, \ldots _{h\alpha i})$ uniformly i.i.d. distributed over $\mathbb{F}q$, from the shared secret randomness received at the random generator 206. Let $_{Di}$ be the matrix formed by the entries of $_{ri}$, as output 208, then compute the length-$_{\alpha i}$ column vector $l_i = h_i - D_i m$ (1) 212 which is the hash of message m. The field size is effectively reduced. To communicate $l_i$, during the i-th stage, the source 20 draws a random vector $\overline{K}_i$ with entries i.i.d uniformly distributed (generated from matrix i.i.d uniform random vector (RV) generator from $\overline{C} \times \overline{b}$ at 216). It then encodes $\overline{X}_i = \overline{K}_i M$, and inputs $\overline{X}_i$ into the network 30. Alternatively, the source may include Xi as a small header when it sends $X_i$.

Figure 3:
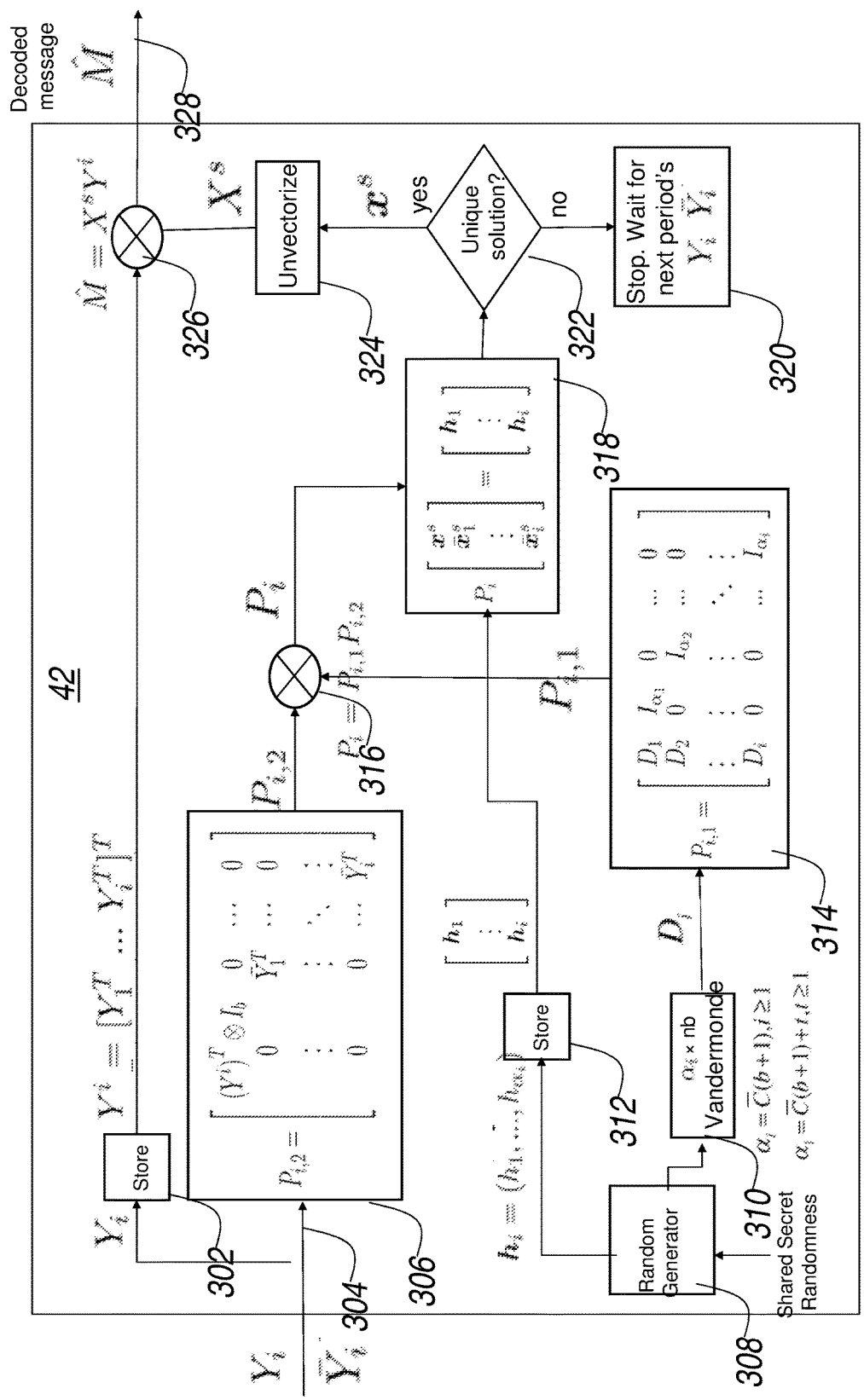
FIG. 3 illustrates further detail of a decoder in an example embodiment.

FIG. 3 further details the decoder 42 (decoders $42_1$ to $42_n$) of FIG. 1. The decoder 42 searches in the row space of the receive packets for an element that satisfies the hash. If found, the decoder announces to the search result to be the decoded message. On the other hand, the decoder 42 waits for more encoded packets if it is not able to find an element that satisfies the hash.

During the i-th stage the terminal 40 receives a batch of packets from the network 30 $Y_i = AX_i + B_i Z_i$ 304 corresponding to $X_i$. The terminal also receives a batch of packets $\overline{Y}i = \overline{AX}i + \overline{B}iZi$ 304 corresponding to Xi (alternatively if Xi is the header of $X_i$, then Yi is the header of the received packets). Therefore, the terminal 40 receives linearly transformed packets.

From the shared secret randomness (received at random generator 308) and the received packets, the decoder can construct a matrix $P_i$ (from 316), which helps solve the following equation system in variables $x^s$ and $x_k^s$, k=1, 2, ..., i: (See block 318)

$$P_i \begin{bmatrix} x^s \\ \overline{x_1^s} \\ \vdots \\ \overline{x_i^s} \end{bmatrix} = \begin{bmatrix} h_1 \\ \vdots \\ h_i \end{bmatrix} \quad \text{(Equation 1)}$$

From the random generator 308 with the shared secret randomness, a Vandermonde type matrix is generated 310 providing a parity check matrix $D_i$. From the input $D_i$, the decoder 42 obtains a matrix $P_{i,1}$ from the shared randomness at 314. Then, a Kronecker product is performed at 316 from the matrices $P_{i,2}$ (received packets) from 306 and $P_{i,1}$ (matrix from the shared randomness) from 314 to output $P_i$. $I_{\alpha i}$ is an identity matrix of order αi and $L_{bi}$ is an identity matrix of order bi.

The decoder 42 solves the system of equations (1) in block 318 in variables $x^s$ and $\underline{x}^s_k$, k=1, . . . i, where $x^s$ is a column vector of length $_i$bC and the $\underline{x}^s_j$'s are column vectors of length C.

If this system is not uniquely solvable 322, i.e., if it has no solution or there are multiple solutions 320, the terminal 40 postpones decoding to the next stage so that it will receive more redundancy (i.e., reception of $Y_{i+1}$ after transmission of $X_{i+1}$ by the encoder at next stage i+1).

If it is uniquely solvable, the decoder 42 can unvectorize at block 324 $x^s$ into a matrix $X^s$ by rearranging every length-b segment of $x^s$ as a column of $X^s$. Then the source message is recovered as:

$$\widehat{\underline{M}_i} = X^s Y^i \quad \text{(equation 2)}$$

(See block 328) from Kronecker product of the matrices $Y^i$ stored in storage 302 and unvectorized output $X^s$ from block 324 to generate the decoded source message at 326 outputted at 328.

Therefore, in the decoding by the decoders 42, there is a question of how many packets are needed to be received. If the adversary (jammer) injects "z" new errors each time period, then a necessary condition is that at least b+Nz packets at time N (Cut-set bound) are necessary to be received, where b is the message packets. From the hashing, verifying the decoding condition and how to decode is provided form the shared randomness and the hash. A perfect hash function behaves like a random function (to the jammer). A hash that is not perfect: $h(m)=m_1+dm_2+ \ldots +d^{nb-1}m_{nb}$, requires only one symbol of shared randomness. The hash function is vector linear whereas the network 30 is linear.

The system 10 may not impose restrictions on the computation capability of the adversary, but it may require shared secret randomness between the source 20 and the terminal 40. In certain settings, it may be more reasonable to assume that the adversary is computationally bounded than to assume the availability of perfect shared randomness. For this case, the system 10 can replace the shared secret randomness by pseudorandomness generated by a pseudorandom generator. Assuming that the source 20 and the terminal 40 share a short secret key e, they may use a pseudorandom generator to create shared pseudorandomness with e.

The key may be pre-allocated, communicated by a secure side-channel, or communicated over the network 30 by using public key infrastructure while disabling network coding. If the above options are not available, then it is also possible to communicate the key via the same network coding system. The short key can be communicated secretly and reliably over the network, provided that the adversary has limited eavesdropping capability. Specifically, instead of allowing the adversary to observe all edges in the network, one can assume that the adversary can eavesdrop on at most a number of $z_w$ edges in the network, such that $z_e+z_w<C$. One can assume that the source 20 has an upper bound on the passive parameter $z_w$, and assume as before that $z_e$ and $_C$ are not known to the source 20 and the terminal 40.

The disclosed scheme is augmented to operate in a rateless manner One of the features is that one bit of information is represented by the rank of a matrix transmitted. To send a bit of 0 a low-rank matrix is generated and transmitted; to send a bit of 1 a full-rank matrix is generated and transmitted. The adversary sees only a limited number of edges and therefore cannot distinguish which bit is sent. The adversary has limited capability to change the rank of the transmitted matrix and therefore the terminal, by testing the rank of the received matrix, can distinguish the bits.

A terminal 40 will decode correctly from decoder 42 at the earliest possible stage with high probability provided the field size q is large. However, a large field size may not be desired. Therefore, the field size can be reduced. One method is to choose a reasonably large t so that $t>ib\overline{C}$. Then it suffices to let q be comparable to $n^2b^2$.

Another method of reducing the field size is the idea to employ a hashing scheme with a constant collision probability, which may be achieved in the following way. The system 10 can construct a matrix $\hat{D}_i$ from the shared randomness such that $\hat{D}_i$ is a matrix of size $\_\alpha_i \times nb$ with entries uniformly i.i.d. distributed over finite field $\mathbb{F}_q$. The hash of message m is then computed as: $l_i=h_i-\hat{D}_i m$. (See block 212 in FIG. 2 of the encoder).

Figure 4:
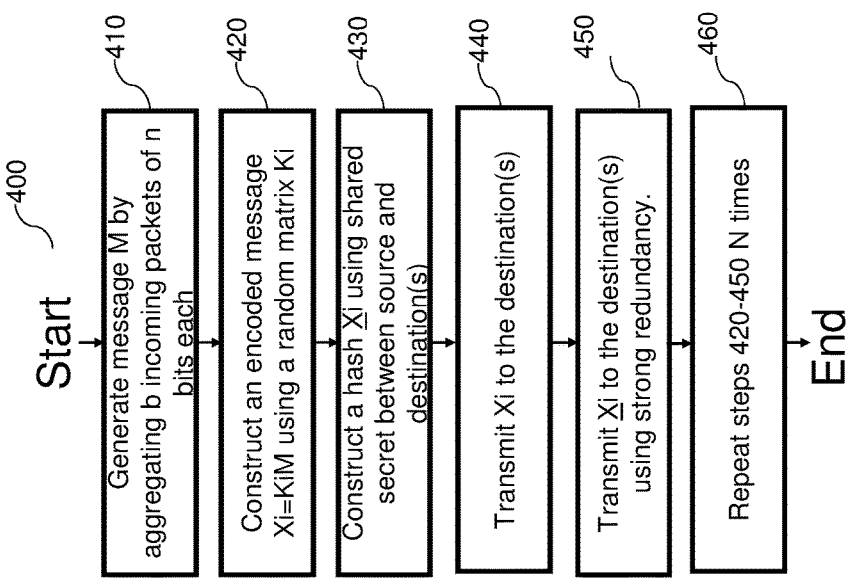
FIG. 4 a flow chart of an encoder in an example embodiment.

FIG. 4 illustrates the method of the encoder with reference to FIGS. 1 and 2. After starting 400, first the encoder 22 generates a message M by aggregating b incoming packets of n bits each 204 (step 410). Then, there is a construction of an encoded message Xi=KiM using a random matrix Ki (step 420) at 218 by performing a Kronecker product of the matrices. Then there is a construction of a hash $\underline{X}$i using shared secret between source and destination(s) in step 430 (See 215 showing hash in period i in FIG. 2 from Ki from RV generator 216 and $l_i$ at 214). The hash $\underline{X}$i=$\underline{K}$iM is constructed by performing a Kronecker product of the matrices at 214. Then the encoder 22 transmits Xi to the destination(s) in step 440 (See reference 219 in FIG. 2 generated from product of Ki and M at 218). Then the encoder 22 transmits $\underline{X}$i to the destination(s) using strong redundancy in step 450 (See reference 222). Then in step 450, steps 420-450 are repeated N times (where N is a positive integer). From the X and hash $\underline{X}$, outgoing links $\overline{C}$ can be sent out 224 (referring to FIG. 2).

Redundancy that applies to the data is further clarified in the following. Suppose there are "b" message packets to transmit and the network employs an arbitrary network code which results in a transform matrix A of rank C. Then in each round the system essentially sends C packets (or more rigorously, a row space of rank C) and so in the i-th round the amount of redundancy is iC-b (if it is not negative). The system cannot decode unless the amount of redundancy is at least the number of injected error packets.

Strong redundancy applies to the hashes and is clarified in the following. In transmitting the hash, in each round it can be thought of the hash packet generated in that round as the only packet to be transmitted, and so the amount of redundancy is C−b=C−1. In other words, the whole network can be dedicated to transmit one short hash packet (for a short time) and this guarantees that the system 10 can finish transmitting the hash packet in just one round regardless of how strong the adversary is.

Figure 5:
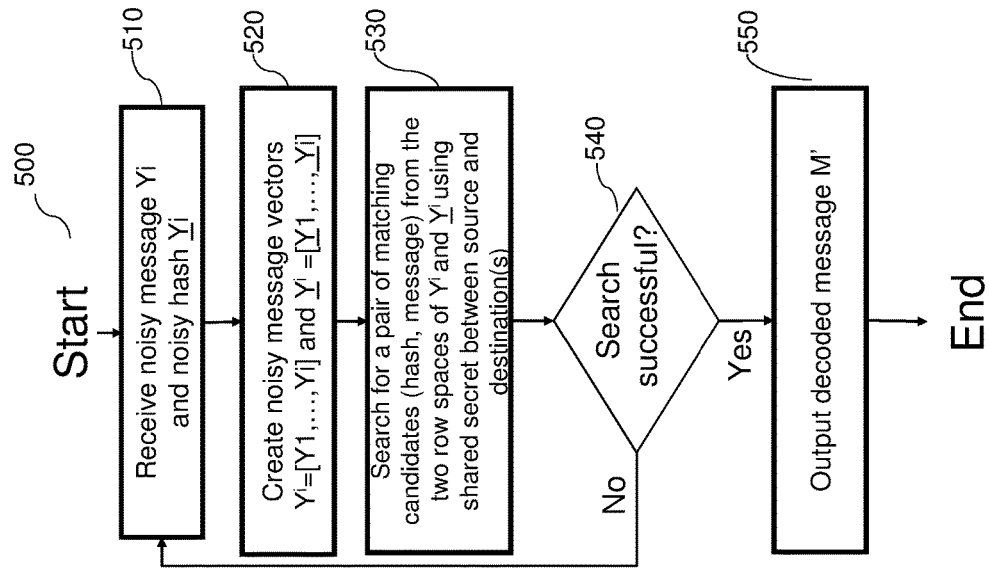
FIG. 5 illustrates a flow chart of decoder in an example embodiment.

FIG. 5 illustrates a method of the decoders 42 with reference to FIGS. 1 and 3. After starting 500, the decoder 42 receives noisy message Yi and noisy hash $\underline{Y}$i in step 510 (See also 302 and 304 in FIG. 3). The decoder 42 then creates noisy message vectors $Y^i$=[Y1, . . . ,Yi] and $\underline{Y}^i$=[$\underline{Y}$1, . . . , $\underline{Y}$i] in step 520 (See 302 to 306 in FIG. 3). Then the decoder 42 searches for a pair of matching candidates (hash, message) from the two row spaces of $Y^i$ and $\underline{Y}^i$ using shared secret randomness (See 308 random generator 308 that generates hi and storage 312 that generates [h1, . . . hi] input to linear system 318) between source 20 and destination(s) 40 in step 530 (See 316-318 in FIG. 3). The decoder 42 then checks to see if the search is successful in step 540 (See block 322 in FIG. 3). If "no", then the decoder 42 goes back to step 510 (See block 320 in FIG. 3). If the answer is "yes", then the decoder 42 proceeds to step 550 (See block 324 in FIG. 3). Then, in step 550 the decoder 42 outputs the decoded message M' (See 326 and 328 in FIG. 3).

Therefore, the disclosed invention designs mechanism to correct adversarial errors in network coding systems, based on rateless information-theoretic error correction codes. There is a design of the rateless network error correction code under the assumption that the source and terminals share random bits, which are kept secret from the adversary. The encoder 22 uses the random bits to hash the message and helps the decoders eliminate injected errors. Over time, the source 20 incrementally sends more linearly dependent redundancy of the message as well as a sequence of short hashes through the network 30. The terminal 40 amasses both the redundancy and the hashes until it decodes successfully, which happens with high probability once the amount of redundancy received meets the cut-set bound. Then it is noted that the secret random bits can be efficiently generated by a cryptographic pseudo-random generator, provided that the adversary is computationally bounded.

The advantage of the disclosed invention is that the present scheme does not require prior knowledge of the network and adversary parameters. Another advantage is that the decoder 42 of the present scheme is more efficient. Specifically, for example, denoting by the packet length, the computational complexity of the present decoding algorithm is reduced. In addition, the communication overhead of the present scheme is smaller than related art schemes. Another advantage of the disclosed invention is that the present scheme is end-to-end and does not require any collaboration from intermediate network nodes.

Exemplary Hardware and Cloud Implementation

Figure 6:
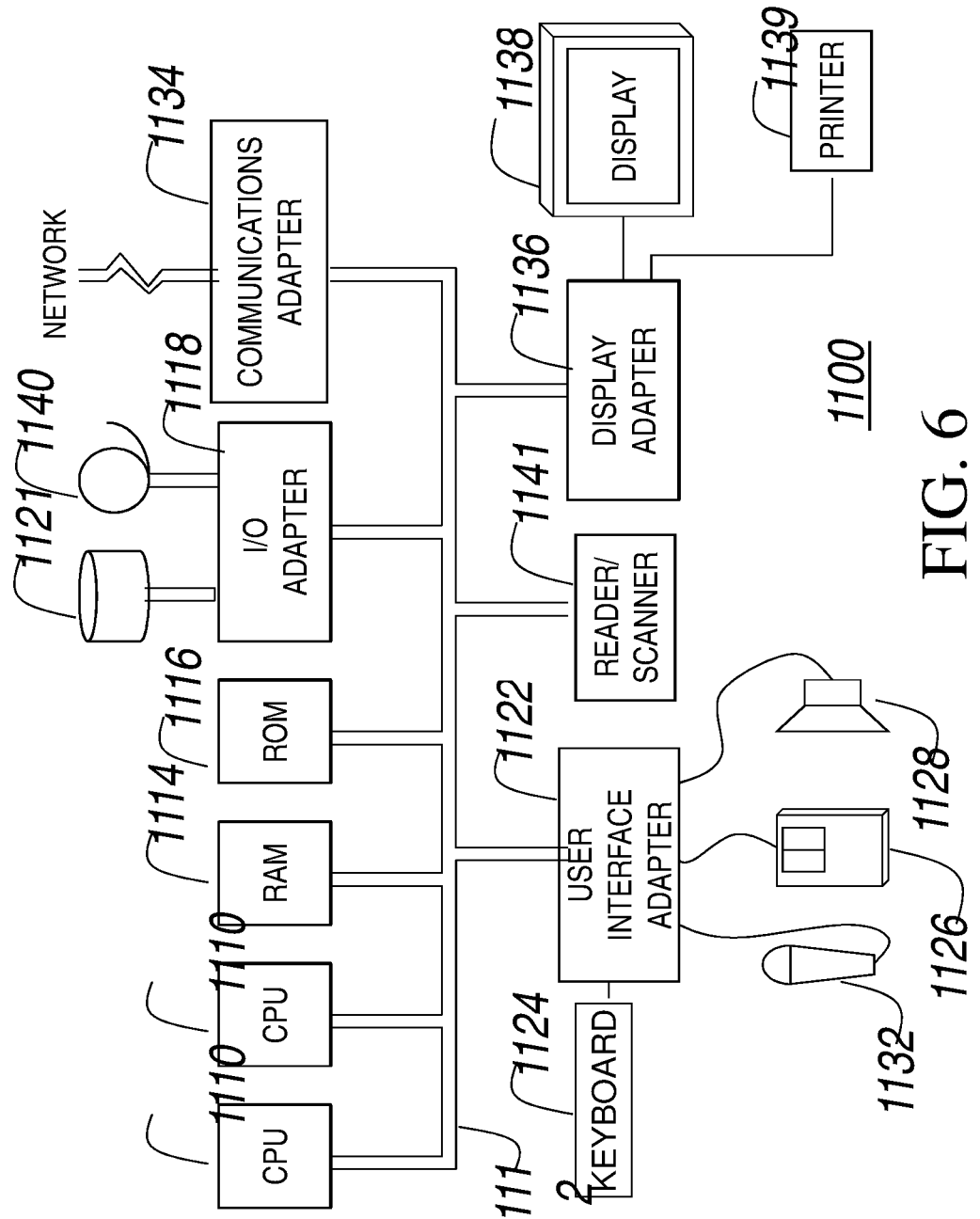
FIG. 6 illustrates an exemplary hardware/information handling system for incorporating the exemplary embodiment of the invention therein.

FIG. 6 illustrates another hardware configuration of an information handling/computer system 1100 in accordance with the disclosed invention and which preferably has at least one processor or central processing unit (CPU) 1110 that can implement the techniques of the invention in a form of a software program.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing storage media tangibly embodying a program of machine-readable instructions executable by a digital data processor incorporating the CPU 1110 and hardware above, to perform the method of the invention.

This signal-bearing storage media may include, for example, a RAM contained within the CPU 1110, as represented by the fast-access storage for example.

Figure 7:
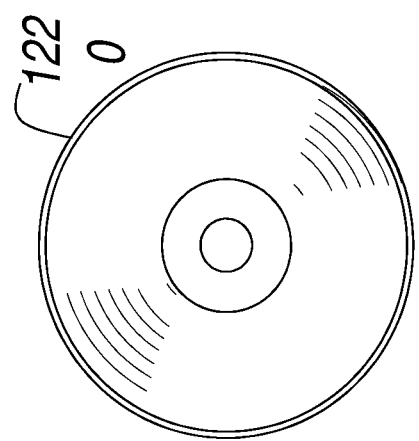
FIG. 7 illustrates a signal-bearing storage medium for storing machine-readable instructions of a program that implements the method according to the exemplary embodiment of the invention.
Figure 7:
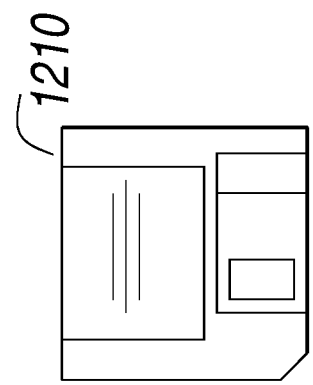

Alternatively, the instructions may be contained in another signal-bearing storage media 1200, such as a magnetic data storage diskette 1210 or optical storage diskette 1220 (FIG. 7), directly or indirectly accessible by the CPU 1210.

Whether contained in the diskette 1210, the optical disk 1220, the computer/CPU 1210, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
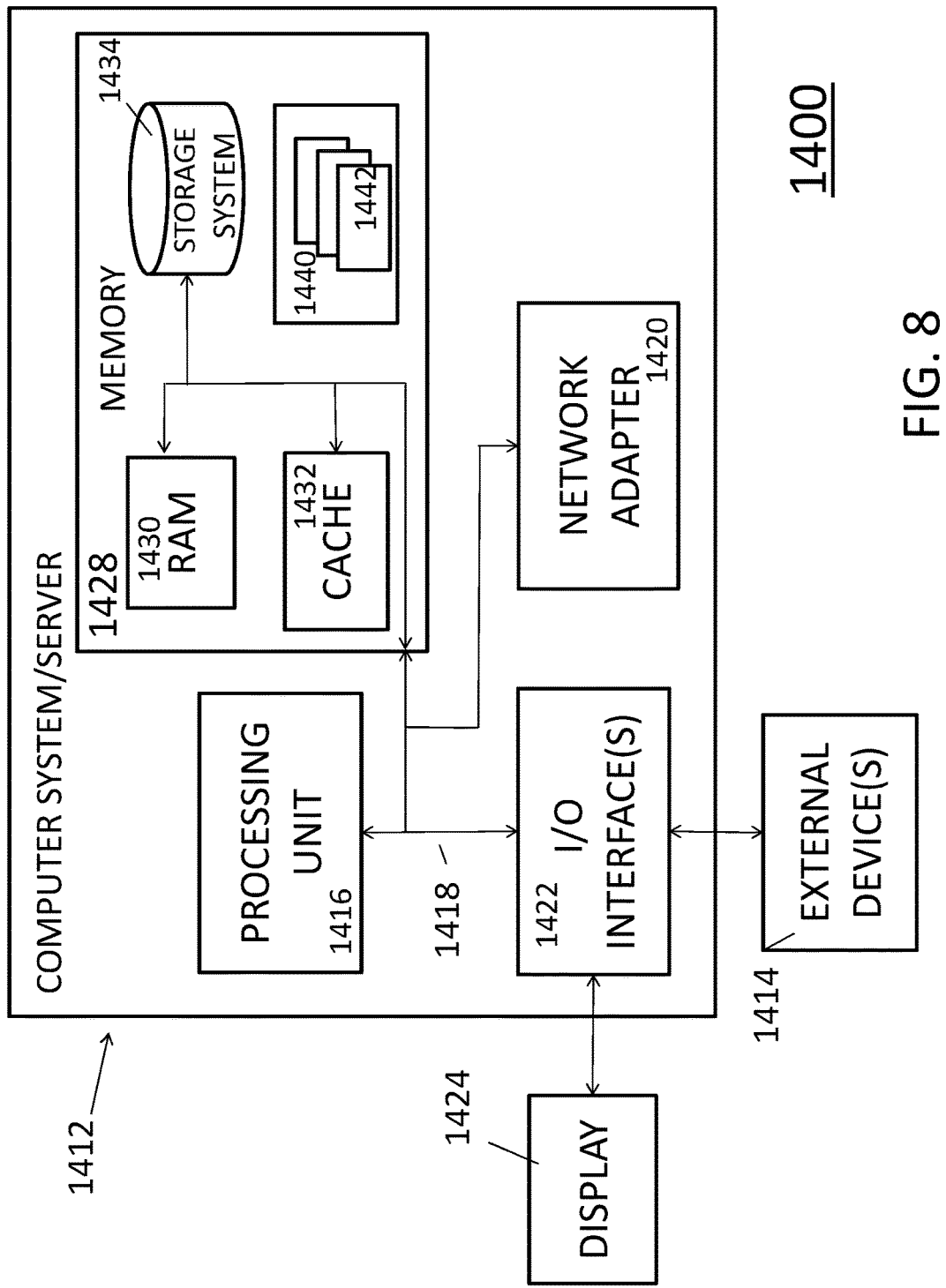
FIG. 8 depicts a cloud computing node according to an embodiment of the present invention.

Referring now to FIG. 8, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove.

In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 1412 in cloud computing node 1400 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 9:
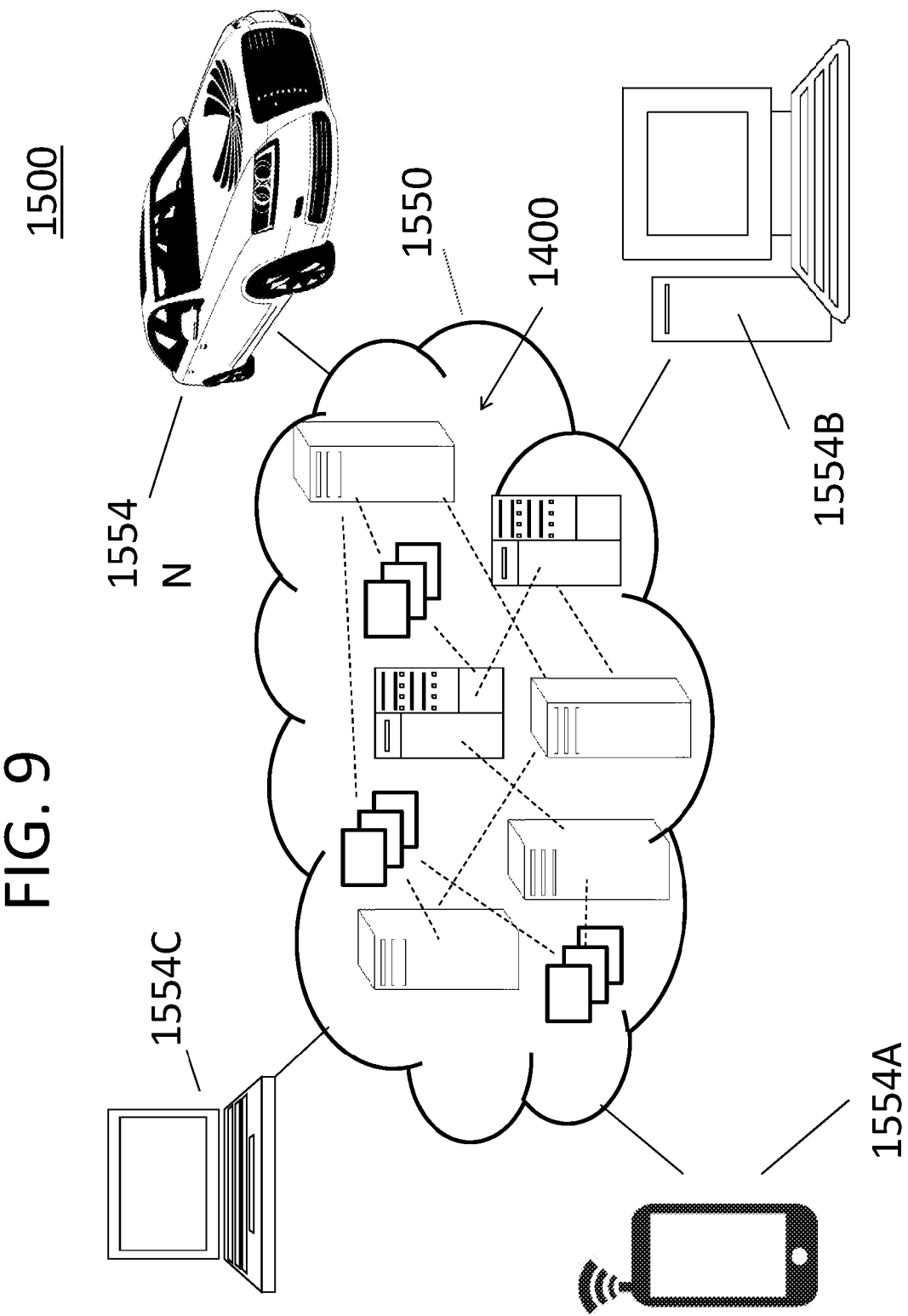
FIG. 9 depicts a cloud computing environment according to an embodiment of the present invention.

Referring now to FIG. 9, illustrative cloud computing environment 1550 is depicted. As shown, cloud computing environment 1550 comprises one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 9 are intended to be illustrative only and that computing nodes 1400 and cloud computing environment 1550 can communicate with any type of computerized device over any type of network and/or network addressable connection (e.g., using a web browser).

Figure 10:
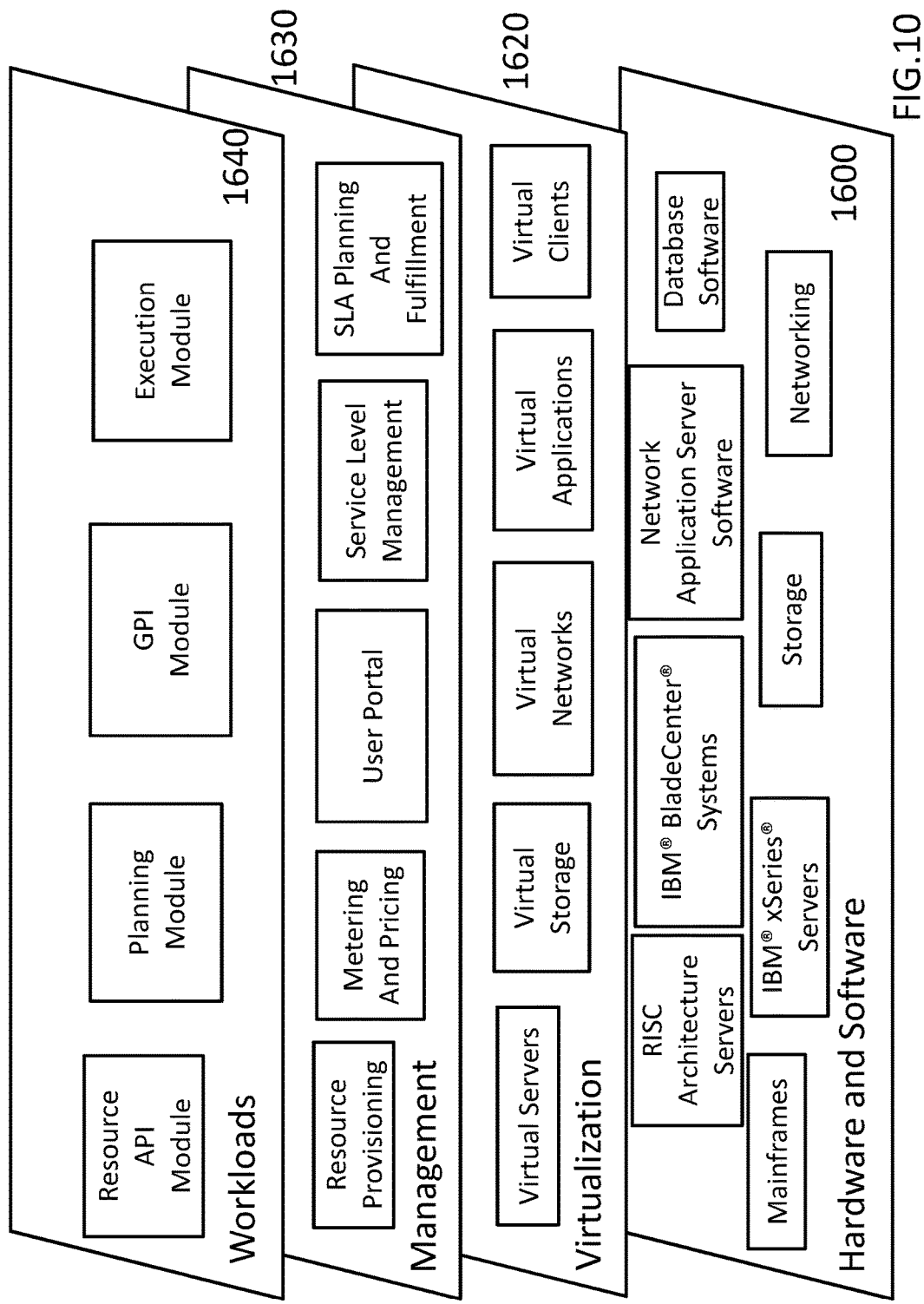
FIG. 10 depicts abstraction model layers according to an embodiment of the present invention.

Referring now to FIG. 10, a set of functional abstraction layers provided by cloud computing environment 1550 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1662 provides an abstraction layer from which the following examples of virtual entities may be provided: virtual servers; virtual storage; virtual networks, including virtual private networks; virtual applications and operating systems; and virtual clients.

In one example, management layer 1664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1666 provides examples of functionality for which the cloud computing environment may be utilized. Examples of workloads and functions which may be provided from this layer include such functions as mapping and navigation; software development and lifecycle management; virtual classroom education delivery; data analytics processing; transaction processing; and, more particularly relative to the disclosed invention, the APIs and run-time system components of generating search autocomplete suggestions based on contextual input.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An encoder comprising:
    a computer readable storage medium storing program instructions; and
    a processor executing the program instructions, the processor configured to:
        generating a message by aggregating a plurality of incoming packets;
        constructing an encoded message using the message and a random matrix;
        constructing of a hash using a shared secret; and
        transmitting the encoded message and the hash to a destination, through a network that performs network coding operations.

2. The encoder according to claim 1, wherein the hash is transmitted alone or as a header of the encoded message.

3. The encoder according to claim 1, wherein the hash is transmitted to the destination using a redundancy.

4. The encoder according to claim 1, wherein a construction of an encoded message comprises $X_i = K_i M$ using a random matrix $K_i$ and received message M, where i is a positive integer, and
    wherein the generating of the message is by aggregating a plurality of incoming packets of a plurality of bits each.

5. The encoder according to claim 1, wherein the construction of the hash comprises vectors $\underline{X}i$ using shared secret between a source and at least one of the destinations in transmitting the encoded message.

6. The encoder according to claim 1, wherein the constructing of the hash, transmitting of the encoded message, and transmitting of the hash are repeated N times, where N is a positive integer, and
    wherein the encoder transmits the hash including vectors $\underline{X}i$ to the destination using a strong type redundancy.

7. A system comprising the encoder according to claim 1, further comprising a decoder deployed in one or more terminals, the decoder comprising:
    a second computer readable storage medium storing second program instructions; and
    a second processor executing the second program instructions, the second processor configured to:
        receiving a noisy message and a noisy hash from the network;
        searching for a pair of matching candidates for the hash and message from two row spaces of noisy message vectors using the shared secret with the encoder; and
        outputting, by the decoder, a decoded message if the searching is successful.

8. The system according to claim 7, further comprising of waiting for a next message if the searching is not successful, and repeating the receiving and the searching for the next message.

9. The system according to claim 7, wherein the decoder receives the noisy message Yi for storage in the second computer readable storage medium,
    wherein the decoder generates the noisy message vectors and noisy hash vectors from the received noisy message and noisy hash, respectively, for use by the searching, and
    wherein the decoder uses a shared secret randomness to construct a matrix Pi in an equation that is checked for a unique solution.

10. The system according to claim 7, wherein the decoder creates noisy message vectors $Y^i = [Y1, \ldots, Yi]$ and noisy hash vectors $\underline{Y}^i = [\underline{Y}1, \ldots, \underline{Y}i]$ for the searching, where i is a positive integer.

11. The system according to claim 10, wherein the decoder searches for a pair of matching candidates from two row spaces of $Y^i$ and $\underline{Y}^i$ using the shared secret between a source and at least one of the destinations.

12. A method, comprising:
    generating a message by aggregating a plurality of incoming packets;
    constructing an encoded message using the message and a random matrix;
    constructing of a hash using a shared secret; and
    transmitting the encoded message and the hash to a destination, through a network that performs network coding operations.

13. The method according to claim 12, wherein the hash is transmitted alone or as a header of the encoded message.

14. The method according to claim 12, wherein the hash is transmitted with a redundancy.

15. The method according to claim 12, wherein the construction of an encoded message comprises $X_i = K_i M$ using a random matrix $K_i$ and received message M, where i is a positive integer, and
    wherein the construction of the hash comprises $\underline{X}i$ using shared secret between a source and at least one of the destinations in transmitting the encoded message.

16. The method according to claim 12, from at least one node, further comprising:
    receiving a noisy message and a noisy hash from the network;
    searching for a pair of matching candidates for the hash and message from the two row spaces of the noisy message vectors using the shared secret; and
    outputting a decoded message if the searching is successful.

17. A computer program product for encoding, the computer program product comprising a computer readable storage medium having program instructions embodied therewith, the program instructions readable and executable by a computer to cause the computer to:
    generate a message by aggregating a plurality of incoming packets;
    construct an encoded message using the message and a random matrix;
    construct a hash using a shared secret; and
    transmit the encoded message and the hash to a destination, through a network that performs network coding operations.

18. The computer program product according to claim 17, wherein the hash is transmitted alone or as a header of the encoded message.

19. The computer program product according to claim 17, wherein the hash is transmitted with a redundancy,
    wherein the construction of an encoded message comprises $X_i = K_i M$ using a random matrix $K_i$ and received message M, where i is a positive integer, and
    wherein the construction of the hash comprises $\underline{X}i$ using shared secret between source and destination(s) in transmitting the encode message to at least one of the destinations.

20. The computer program product according to claim 17, from at least one node, further comprising:
    receiving a noisy message and a noisy hash from the network;

searching for a pair of matching candidates for the hash and message from the two row spaces of the noisy message vectors using the shared secret; and outputting a decoded message if the searching is successful.

* * * * *